Jan. 3, 1928.
1,654,675
J. H. BOURGON
AUTOMOBILE BRACING ATTACHMENT
Filed April 14, 1924
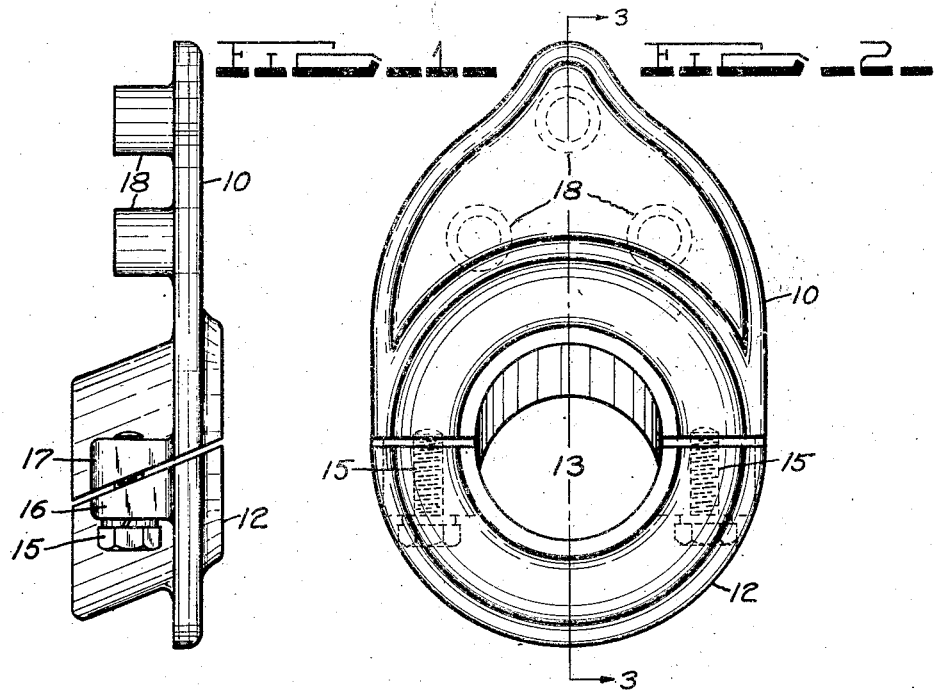
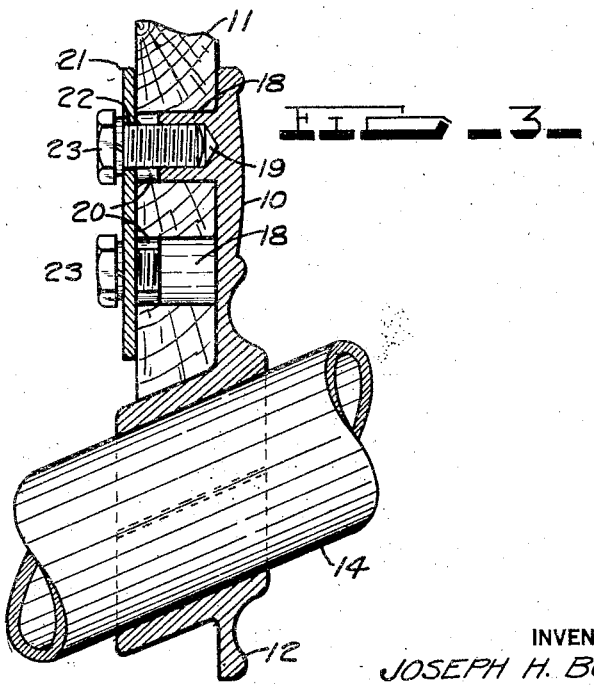
INVENTOR
JOSEPH H. BOURGON
BY
ATTORNEY Patented Jan. 3, 1928.

1,654,675

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

AUTOMOBILE BRACING ATTACHMENT.

Application filed April 14, 1924. Serial No. 706,499.

This invention relates to supporting brackets for the steering posts of automobiles of the type commonly secured to the instrument board of the automobile to steady and prevent vibration of the upper end of the steering column.

Heretofore these brackets have been more or less of unimproved design, particularly in reference to their appearance when in place, due to the fact that the screws and nuts employed to hold the bracket to the steering column have been so placed as to be plainly visible from the driving compartment as are also the bolt heads and in some cases the nuts employed to secure the bracket to the instrument board. Carelessness in the operation of loosening or tightening these bolts and nuts invariably causes burrs to appear on them and mars or destroys their ornamental finish to the detriment of the appearance of the instrument board and of the driving compartment in general.

Another objection is that when the bracket is provided with a perfectly flat face to abut against the instrument board and bolts are passed through both the bracket and instrument board to hold the former to the latter, a slight loosening of the nuts employed to hold the bolts in place invariably allows the bracket a limited amount of movement on the face of the instrument board with resulting detrimental effect to both the finish of the instrument board around the bracket and to the result for which the bracket is intended.

The object of the present invention is to provide such a steering post bracket composed of two parts, a main or bracket portion and a cap, the screws of which, employed to hold the cap to the bracket and the bracket to the instrument board, are completely concealed from the view of anyone in the driving compartment of the automobile of which it forms a part.

Another object of this invention is to provide internally threaded bosses projecting rearwardly from the main portion of the bracket, which bosses are adapted to be received in corresponding openings in the instrument board, thereby preventing lateral movement of the bracket in relation to the face thereof, and which bosses are adapted to receive screws inserted from the back of the instrument board to hold the bracket against the face thereof.

A further object of the present invention is to provide a bracket of improved appearance that is simple in design, economical to manufacture, efficient in operation, and that particularly lends itself to manufacture by die-casting.

The above being among the objects of the present invention, the same consists of certain features of construction and combination of parts to be hereinafter described with reference to the accompanying drawing, and then claimed, having the above and other objects in view.

In the accompanying drawing which illustrates a suitable embodiment of the present invention, and in which like numerals refer to like parts throughout the several views, Figure 1 is a side view of the bracket and cap in assembled position.

Figure 2 is a face view of the bracket and cap of Figure 1.

Figure 3 is a sectional view of the bracket and cap taken figuratively on a line such as 3—3 of Figure 2 showing the manner in which the same is secured to the instrument board of an automobile and the manner in which a steering post is supported thereby.

The bracket is formed in two parts, the upper or bracket proper 10 which is secured to the instrument board 11, and the lower portion or cap 12. The instrument board may be of any approved type, but for illustration is shown as the full wooden type. The adjacent faces of the bracket proper 10 and cap 12 are formed to provide an opening 13 of a correctly disposed angle to the face of the bracket for receiving the steering post 14, the steering post 14 being clamped therein by drawing up the cap 12 towards the bracket proper 10 by means of the screws 15 which pass through the ears 16 of the bracket 12 and thread into the ears 17 of the bracket proper 10. The ears 16 and 17 and screws 15 are disposed back of and within the lateral limits of the face of the bracket proper 10 and cap 12, so that they are completely concealed from view from the face side of the bracket.

The bracket proper 10 is provided with three rearwardly extending bosses 18 disposed in triangular relation, each of which is provided with a blind threaded opening 19. The instrument board 11 is provided with three openings 20 which are adapted to closely receive the bosses 18. A metal plate 21, provided with openings 22 which match the openings 20 in the instrument board 11, is placed in matched position therewith against the rear face of the instrument board 11 and screws 23 are inserted in the openings 22 and are threaded into the blind openings 19 of the bosses 18, drawing the bracket proper into firm contact with the front face of the instrument board 11. Although it is desirable, and it may be said to be necessary, to draw the bracket proper 10 tightly against the face of the instrument board 11 to properly support the post 14, it is to be understood that the prevention of lateral movement of the bracket is not dependent upon the force with which the bracket proper 10 is held against the instrument board 11 as in the conventional designs, but rather depends upon the fact that the bosses 18 are closely received in the openings 20 in the instrument board 11, and it is therefore evident that if the screws 23 are inadvertently not drawn up securely, the bracket will still be held from lateral movement in contrast to the conventional constructions which will not be.

Another important advantage is that the means for securing the bracket proper 10 to the instrument board 11 are disposed entirely behind the face of the bracket proper 10 and no indication whatever of such means is apparent from the face side of the bracket. It is thus apparent that from the face side of the bracket, or in other words, from the driving compartment of the automobile of which it is adapted to form a part, there are no apparent means for securing the bracket proper 10 to the instrument board 11 and the cap 12 to the bracket proper 10, thus resulting in a pleasing appearing bracket which may be formed to any ornamental shape desired.

Having thus described my invention what I claim is:—

1. In an automobile, the combination with an instrument board having a plurality of transverse openings extending therethrough, a steering column, means for supporting said steering column from said instrument board, said means comprising a bracket located in abutting relationship with the exposed face of said instrument board, a plurality of bosses extending from said bracket adapted to snugly fit within and be supported by said openings provided in said instrument board, and means threadedly engageable with said bosses from the unexposed face of the board for maintaining said bracket in tight abutting relationship with the exposed face of the instrument board, said fastening devices being invisible from the driver's compartment, said bracket having a downwardly depending supporting portion adapted to receive said steering column to support the same relative to the instrument board.

2. In combination, an instrument board provided with a plurality of apertures, a steering column, a bracket for supporting said steering column relative to the instrument board, said bracket adapted to abuttingly engage the exposed face of said instrument board and having a plurality of integral interiorly threaded bosses extending therefrom adapted to snugly fit within the confines of the openings provided in said instrument board, means for holding said bracket into tight engagement with said instrument board, said means comprising a plurality of fastening devices on the unexposed face of said instrument board threadedly engaging the interiors of said bosses, and a depending extension of said bracket having an inclined bearing surface for receiving and supporting said steering column relative to the instrument board.

Signed by me at Detroit, Michigan, U. S. A. this 8th day of April, 1924.

JOSEPH H. BOURGON.